US012562319B2

(12) United States Patent
Lee et al.

(10) Patent No.: US 12,562,319 B2
(45) Date of Patent: **\*Feb. 24, 2026**

(54) SEPARATOR FOR ELECTROCHEMICAL DEVICE AND METHOD FOR MANUFACTURING THE SAME

(71) Applicant: LG Chem, Ltd., Seoul (KR)

(72) Inventors: A-Young Lee, Daejeon (KR); Joo-Sung Lee, Daejeon (KR); Won-Sik Bae, Daejeon (KR); Bi-Oh Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/964,375

(22) PCT Filed: Sep. 16, 2019

(86) PCT No.: PCT/KR2019/011946
§ 371 (c)(1),
(2) Date: Jul. 23, 2020

(87) PCT Pub. No.: WO2020/055217
PCT Pub. Date: Mar. 19, 2020

(65) Prior Publication Data
US 2021/0036287 A1 Feb. 4, 2021

(30) Foreign Application Priority Data

Sep. 12, 2018 (KR) ........................ 10-2018-0109238

(51) Int. Cl.
*H01G 11/52* (2013.01)
*C08L 27/16* (2006.01)
(Continued)

(52) U.S. Cl.
CPC .............. *H01G 11/52* (2013.01); *C08L 27/16* (2013.01); *H01G 11/22* (2013.01); *H01G 11/84* (2013.01);
(Continued)

(58) Field of Classification Search
CPC ........ H01G 11/22; H01G 11/52; H01G 11/84; H01M 50/44; H01M 50/403;
(Continued)

(56) References Cited

U.S. PATENT DOCUMENTS

| | | |
|---|---|---|
| 6,294,290 B1 | 9/2001 | Kim |
| 2004/0053122 A1 | 3/2004 | Sugiyama et al. |

(Continued)

FOREIGN PATENT DOCUMENTS

| | | |
|---|---|---|
| CN | 1495936 A | 5/2004 |
| CN | 103155217 A | 6/2013 |

(Continued)

OTHER PUBLICATIONS

Toyomasu, T. "Evaluation of Solvent Resistance of Materials Using Dissolution Parameters (SP Values)," Toray Research Center the TRC News, Feb. 2015, pp. 25-26, No. 120. (Providing English Translation of Abstract only).

(Continued)

*Primary Examiner* — Armindo Carvalho, Jr.
(74) *Attorney, Agent, or Firm* — Lerner David LLP

(57) ABSTRACT

A separator for an electrochemical device is provided. The separator comprises a porous substrate having a plurality of pores, and a porous coating layer positioned on at least one surface of the porous substrate, the porous coating layer including a plurality of inorganic particles and a binder polymer positioned on a whole or a part of the surface of the inorganic particles to connect the inorganic particles with one another and fix the inorganic particles, wherein the (Continued)

5.0kV 8.0mm x3.00k SE(U,LAO)          10.0μm binder polymer comprises a first binder polymer and a second binder polymer. The first binder polymer has an electrolyte uptake of 80-165%, and the second binder polymer has an electrolyte uptake of 20-40%. An electrochemical device including the separator is also disclosed.

9 Claims, 2 Drawing Sheets

(51) Int. Cl.

| | |
|---|---|
| *H01G 11/22* | (2013.01) |
| *H01G 11/84* | (2013.01) |
| *H01M 4/62* | (2006.01) |
| *H01M 10/0525* | (2010.01) |
| *H01M 50/403* | (2021.01) |
| *H01M 50/417* | (2021.01) |
| *H01M 50/426* | (2021.01) |
| *H01M 50/44* | (2021.01) |
| *H01M 50/443* | (2021.01) |
| *H01M 50/446* | (2021.01) |
| *H01M 50/449* | (2021.01) |
| *H01M 50/489* | (2021.01) |
| *H01M 50/491* | (2021.01) |

(52) U.S. Cl.
CPC ....... *H01M 4/623* (2013.01); *H01M 10/0525* (2013.01); *H01M 50/403* (2021.01); *H01M 50/417* (2021.01); *H01M 50/426* (2021.01); *H01M 50/44* (2021.01); *H01M 50/443* (2021.01); *H01M 50/446* (2021.01); *H01M 50/449* (2021.01); *H01M 50/489* (2021.01); *H01M 50/491* (2021.01); *C08L 2203/206* (2013.01); *C08L 2205/025* (2013.01)

(58) Field of Classification Search
CPC ............. H01M 50/417; H01M 50/426; H01M 50/443; H01M 50/446; H01M 50/449; H01M 50/489; H01M 50/491
See application file for complete search history.

(56) References Cited

U.S. PATENT DOCUMENTS

| | | | | |
|---|---|---|---|---|
| 2009/0117453 | A1* | 5/2009 | Kikuchi | H01M 50/457 |
| | | | | 428/315.9 |
| 2011/0311855 | A1* | 12/2011 | Peng | H01M 4/0402 |
| | | | | 427/466 |
| 2012/0090758 | A1* | 4/2012 | Lee | H01M 50/449 |
| | | | | 429/251 |
| 2013/0095365 | A1 | 4/2013 | Nishikawa | |
| 2014/0227593 | A1 | 8/2014 | Lee et al. | |
| 2014/0248525 | A1 | 9/2014 | Iwai et al. | |
| 2014/0308567 | A1 | 10/2014 | Nishikawa et al. | |
| 2015/0017532 | A1* | 1/2015 | Iguchi | H01M 4/623 |
| | | | | 252/182.1 |
| 2015/0200388 | A1 | 7/2015 | Yoshitomi | |
| 2016/0028066 | A1* | 1/2016 | Yu | H01M 4/525 |
| | | | | 429/145 |
| 2016/0164059 | A1 | 6/2016 | Hong et al. | |
| 2016/0293922 | A1* | 10/2016 | Umeyama | H01M 10/052 |
| 2017/0338460 | A1* | 11/2017 | Kim | C09J 7/30 |

| | | | | |
|---|---|---|---|---|
| 2018/0034025 | A1 | 2/2018 | Lee et al. | |
| 2018/0123106 | A1* | 5/2018 | Shin | H01M 50/403 |
| 2018/0233726 | A1 | 8/2018 | Nagao | |
| 2019/0044118 | A1* | 2/2019 | Sakurai | H01M 50/417 |
| 2019/0245183 | A1 | 8/2019 | Jeong et al. | |
| 2019/0273238 | A1 | 9/2019 | Mizuno et al. | |
| 2020/0266407 | A1 | 8/2020 | Honda et al. | |
| 2020/0373540 | A1 | 11/2020 | Lee et al. | |

FOREIGN PATENT DOCUMENTS

| | | | |
|---|---|---|---|
| CN | 103890998 | A | 6/2014 |
| CN | 104094447 | A | 10/2014 |
| CN | 106784534 | A | 5/2017 |
| CN | 108352484 | A | 7/2018 |
| JP | 2016072155 | A | 5/2016 |
| JP | 2016189261 | A | 11/2016 |
| JP | 2017183212 | A | 10/2017 |
| JP | 2017208338 | A | 11/2017 |
| JP | 2018133244 | A | 8/2018 |
| JP | 2018141091 | A | 9/2018 |
| JP | 2021512462 | A | 5/2021 |
| KR | 100263153 | B1 | 8/2000 |
| KR | 20120108686 | A | 10/2012 |
| KR | 20140026009 | A | 3/2014 |
| KR | 101491061 | B1 | 2/2015 |
| KR | 101514314 | B1 | 4/2015 |
| KR | 20160069386 | A | 6/2016 |
| KR | 20170037556 | A | 4/2017 |
| KR | 20170098146 | A | 8/2017 |
| KR | 20170129452 | A | 11/2017 |
| KR | 20180093831 | A | 8/2018 |
| WO | 2013058371 | A1 | 4/2013 |
| WO | 2018021398 | A1 | 2/2018 |

OTHER PUBLICATIONS

Yamada, M. et al., "Crosslinking Reactions between Isocyanate Compounds and Acetoacetylated PVA in Water and in Organic Solvent Systems," Jan. 2008, pp. 191-198, vol. 54, No. 4. (Providing English Translation of Abstract only).
International Search Report for Application No. PCT/KR2019/011946 mailed Dec. 26, 2019, 2 pages.
Extended European Search Report for Application No. 19860975.2, dated Apr. 15, 2021, 11 pages.
Extended European Search Report including Written Opinion for EP19858870.9 issued Apr. 15, 2021; 7 pages.
Kiyono et al. "Solvent Recovery using Porous Polydimethylsiloxine Membranes by Low-Pressure Filtration from Waste Liquid Containing Organic Solvent" Journal of Environmental Chemistry vol. 24, No. 4, pp. 113-117, 2014.
International Search Report for Application No. PCT/KR2019/011947 mailed Dec. 26, 2019, 2 pages.
Search Report dated Feb. 11, 2022 from the Office Action for Chinese Application No. 201980008726.0 issued Feb. 23, 2022, 3 pages.
Brdicka, R. et al., "Surface area and pore size determination Modern Methods in Heterogeneous Catalysis Research," Handbook of Heterogeneous Catalysis, VCH, Weinheim Handbook of Porous Solids, Nov. 1, 2013, pp. 1-52, XP055643749.
Malvern "A Basic Guide to Particle Characterization", Malvern Instruments Worldwide, May 2, 2012 (May 2, 2012), pp. 1-26, XP055089322.
Fedelich, N. "Application Handbook Thermal Analysis of Polymers Selected Applications", Thermal Analysis, Jan. 1, 2013 (Jan. 1, 2013), pp. 1-40, XP055608279.

\* cited by examiner

SEPARATOR FOR ELECTROCHEMICAL DEVICE AND METHOD FOR MANUFACTURING THE SAME

CROSS-REFERENCE TO RELATED APPLICATION

The present application is a national phase entry under 35 U.S.C. § 371 of International Application No. PCT/KR2019/011946 filed Sep. 16, 2019 which claims priority from Korean Patent Application No. 10-2018-0109238 filed on Sep. 12, 2018 in the Republic of Korea, the disclosures of which are incorporated herein by reference.

TECHNICAL FIELD

The present disclosure relates to a separator for an electrochemical device and a method for manufacturing the same. Particularly, the present disclosure relates to a separator for an electrochemical device which shows improved adhesion to an electrode and adhesion to a porous substrate and satisfies both the resistance and air permeability required for a separator for an electrochemical device, and a method for manufacturing the same.

BACKGROUND ART

Recently, a great attention has been given to electrochemical devices, particularly in terms of ensuring safety, in the field of electrochemical devices. Particularly, a secondary battery, such as a lithium secondary battery, has an electrode assembly including a positive electrode, a negative electrode and a separator. Such an electrode assembly may have a structure in which the separator is interposed between the positive electrode and the negative electrode.

A separator used for a lithium secondary battery takes the form of a porous woven fabric or non-woven fabric, or is a porous separator having pores formed through a dry process or wet process, in the case of a film or membrane. However, such a porous separator uses a binder for its binding with an electrode, wherein the binder not only is coated on the surface of a porous polymer substrate but also infiltrates into the pores of the porous polymer substrate, and thus causes a problem of degradation of the function of the separator as an ion channel.

More particularly, a stacked lithium secondary battery or stacked-folded lithium secondary battery is manufactured with ease, has a structure which may utilize the space efficiently, and can maximize the content of electrode active materials to realize a highly integrated battery.

Particularly, a binder is used in order to bind a separator with an electrode in a stacked-folded structure, and binders having a $T_m$ of 140° C. or lower are preferred for this purpose. When a separator is coated, a process for forming pores in the coated binder through phase separation is used. However, when the phase separation shows excessively high kinetics, there is a problem in that most of the binder forms large pores on the coating layer and adhesion between the substrate and the coating layer is low. On the other hand, when the phase separation shows excessively low kinetics, there is a problem in that most of the binder is formed at the bottom surface of the coating layer with small pores or with no porous structure, and no adhesive layer with the electrode is formed.

DISCLOSURE

Technical Problem

The present disclosure is designed to solve the problems of the related art, and therefore the present disclosure is directed to providing a separator for an electrochemical device which shows improved adhesion to an electrode and adhesion to a porous substrate and satisfies both the resistance and air permeability required for a separator for an electrochemical device, and a method for manufacturing the same.

The present disclosure is also directed to providing a lithium secondary battery including the separator having improved adhesion to an electrode.

Technical Solution

In one aspect of the present disclosure, there is provided a separator for an electrochemical device as defined in any one of the following embodiments.

According to the first embodiment of the present disclosure, there is provided a separator for an electrochemical device which comprises:

a porous substrate having a plurality of pores; and a porous coating layer positioned on at least one surface of the porous substrate, and including a plurality of inorganic particles and a binder polymer positioned on the whole or a part of the surface of the inorganic particles to connect the inorganic particles with one another and fix them, wherein the binder polymer comprises a first binder polymer and a second binder polymer, the first binder polymer has an electrolyte uptake of 80-165%, and the second binder polymer has an electrolyte uptake of 20-40%.

According to the second embodiment of the present disclosure, there is provided the separator for an electrochemical device as defined in the first embodiment, wherein the first binder polymer can have a melting point of 130-135° C., and the second binder polymer can have a melting point of 135-140° C.

According to the third embodiment of the present disclosure, there is provided the separator for an electrochemical device as defined in the first or the second embodiment, wherein the first binder polymer can include poly(vinylidene fluoride-co-hexafluoroproyplene) (PVdF-HFP), poly(vinylidene fluoride-co-chlorotrifluoroethylene) (PVdF-CTFE), or a mixture thereof, and the second binder polymer can include poly(vinylidene fluoride-co-tetrafluoroethylene) (PVdF-TFE), poly(vinylidene fluoride-co-trifluoroethylene) (PVdF-TrFE), or a mixture thereof.

According to the fourth embodiment of the present disclosure, there is provided the separator for an electrochemical device as defined in any one of the first to the third embodiments, wherein the first binder polymer may have a viscosity of 50-70 cp, the second binder polymer may have a viscosity of 600-800 cp, and the viscosity may be a viscosity value determined at a shear rate of 100/s from slurry containing 35 parts by weight of the first binder polymer or the second binder polymer, 65 parts by weight of $Al_2O_3$ having an average particle diameter ($D_{50}$) of 500 nm, and 400 parts by weight of N-methyl-2-pyrrolidone (NMP).

According to the fifth embodiment of the present disclosure, there is provided the separator for an electrochemical device as defined in any one of the first to the fourth embodiments, wherein the first binder polymer can have an electrolyte uptake of 90-130%, and the second binder polymer can have an electrolyte uptake of 25-35%.

According to the sixth embodiment of the present disclosure, there is provided the separator for an electrochemical device as defined in any one of the first to the fifth embodiments, wherein the weight ratio of the first binder polymer to the second binder polymer can be 50:50-85:15.

According to the seventh embodiment of the present disclosure, there is provided the separator for an electrochemical device as defined in any one of the first to the sixth embodiments, wherein the surface of the porous coating layer can include a plurality of nodes including the inorganic particles and the binder polymer covering at least a part of the surface of the inorganic particles, and at least one filament formed from the binder polymer of the nodes in a thread-like shape, and the filament includes a node-linking portion extended from the node and connecting the node with another node.

According to the eighth embodiment of the present disclosure, there is provided the separator for an electrochemical device as defined in any one of the first to the seventh embodiments, wherein a plurality of nodes containing the inorganic particles and the binder polymer covering at least a part of the surface of the inorganic particles form interstitial volumes, while being in close contact with one another, at the inner part of the porous coating layer, and the pores formed by the interstitial volumes converted into vacant spaces totally can have a size smaller than the diameter of the inorganic particles.

In another aspect of the present disclosure, there is also provided a method for manufacturing a separator for an electrochemical device as defined in any one of the following embodiments.

According to the ninth embodiment of the present disclosure, there is provided a method for manufacturing a separator for an electrochemical device, including the steps of:

(S1) preparing slurry for a porous coating layer comprising a solvent, inorganic particles and a binder polymer, wherein the binder polymer comprises a first binder polymer and a second binder polymer;

(S2) applying the slurry for a porous coating layer to at least one surface of a porous substrate; and (S3) dipping the resultant product of steps (S2) in a solidifying solution including a non-solvent, wherein the first binder polymer has an electrolyte uptake of 80-165%, the second binder polymer has an electrolyte uptake of 20-40%, and the slurry for a porous coating layer has a viscosity value of 100-400 cp, as determined at a shear rate of 100/s.

According to the tenth embodiment of the present disclosure, there is provided the method for manufacturing a separator for an electrochemical device as defined in the ninth embodiment, wherein the first binder polymer can have a melting point of 130-135° C., and the second binder polymer can have a melting point of 135-140° C.

According to the eleventh embodiment of the present disclosure, there is provided the method for manufacturing a separator for an electrochemical device as defined in the ninth or the tenth embodiment, wherein the first binder polymer can include poly(vinylidene fluoride-co-hexafluo-roproyplene) (PVdF-HFP), poly(vinylidene fluoride-co-chlorotrifluoroethylene) (PVdF-CTFE), or a mixture thereof, and the second binder polymer includes poly(vinylidene fluoride-co-tetrafluoroethylene) (PVdF-TFE), poly(vinylidene fluoride-co-trifluoroethylene) (PVdF-co-TrFE), or a mixture thereof.

According to the twelfth embodiment of the present disclosure, there is provided the method for manufacturing a separator for an electrochemical device as defined in any one of the ninth to the eleventh embodiments, wherein the first binder polymer can have a viscosity of 50-70 cp, the second binder polymer can have a viscosity of 600-800 cp, and the viscosity may be a viscosity value determined at a shear rate of 100/s from slurry containing 35 parts by weight of the first binder polymer or the second binder polymer, 65 parts by weight of $Al_2O_3$ having an average particle diameter ($D_{50}$) of 500 nm, and 400 parts by weight of N-methyl-2-pyrrolidone (NMP).

According to the thirteenth embodiment of the present disclosure, there is provided the method for manufacturing a separator for an electrochemical device as defined in any one of the ninth to the twelfth embodiments, wherein the first binder polymer can have an electrolyte uptake of 90-130%, and the second binder polymer can have an electrolyte uptake of 25-35%.

According to the fourteenth embodiment of the present disclosure, there is provided the method for manufacturing a separator for an electrochemical device as defined in any one of the ninth to the thirteenth embodiments, wherein the weight ratio of the first binder polymer to the second binder polymer can be 50:50-85:15.

In still another aspect of the present disclosure, there is provided an electrochemical device as defined in any one of the following embodiments.

According to the fifteenth embodiment of the present disclosure, there is provided an electrochemical device comprising a positive electrode, a negative electrode and a separator interposed between the positive electrode and the negative electrode, wherein the separator is the separator for an electrochemical device as defined in any one of the first to the eighth embodiments.

According to the sixteenth embodiment of the present disclosure, there is provided the electrochemical device as defined in the fifteenth embodiment, which is a secondary battery.

Advantageous Effects

According to an embodiment of the present disclosure, two different types of binder polymers having a specific range of electrolyte uptake different from each other are used for a porous coating layer. Therefore, the advantages of each type of binder polymers realize a synergic effect, and thus it is possible to provide a separator for an electrochemical device having improved adhesion to an electrode and adhesion to a porous substrate, and satisfying low resistance and high air permeability required for a separator for an electrochemical device, and a method for manufacturing the same.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Figure 1:
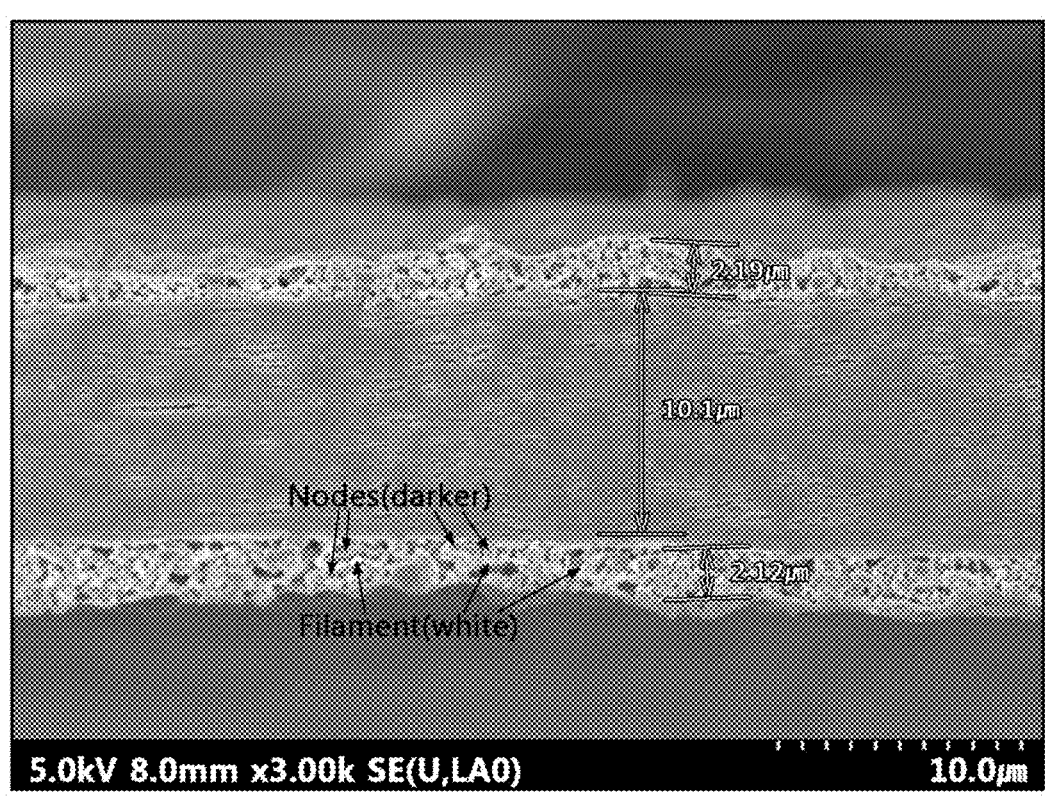
FIG. 1 is an electron microscopic image illustrating the cross section of the separator according to Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a separator for an electrochemical device which comprises:

a porous substrate having a plurality of pores; and a porous coating layer positioned on at least one surface of the porous substrate, and including a plurality of inorganic particles and a binder polymer positioned on the whole or a part of the surface of the inorganic particles to connect the inorganic particles with one another and fix them, wherein the binder polymer comprises a first binder polymer and a second binder polymer, the first binder polymer has an electrolyte uptake of 80-165%, and the second binder polymer has an electrolyte uptake of 20-40%.

The porous polymer substrate used for the separator according to the present disclosure may be any planar porous polymer substrate used currently for electrochemical devices, and particular examples thereof include porous membranes or non-woven fabrics formed of various polymers. For example, a polyolefin-based porous membrane or a non-woven fabric formed of polyethylene terephthalate fibers used as a separator for electrochemical devices, particularly a lithium secondary battery, may be used, and the materials and types thereof may be selected diversely depending on purposes. For example, the polyolefin-based porous membrane may be formed of any one polyolefin-based polymer selected from the group consisting of: polyethylene, such as high density polyethylene, linear low density polyethylene, low density polyethylene and ultra-high-molecular weight polyethylene; polypropylene; polybutylene; and polypentene, or a polymer blend containing at least two of them. In addition, the non-woven fabric may be made of a polyolefin-based polymer or a polymer having higher heat resistance as compared to polyolefin-based polymers.

The porous polymer substrate may have a thickness of 1-30 μm. For example, the porous polymer substrate may have a thickness of 1-20 μm, or 5-20 μm. When the porous polymer substrate has a thickness less than 1 μm, it is difficult to retain physical properties. When the porous polymer substrate has a thickness larger than 30 μm, battery resistance may be increased.

The porous polymer substrate may have a porosity of 30-75%. For example, the porous polymer substrate may have a porosity of 35-65%. When the porosity satisfies the above-defined range, it is possible to prevent an increase in battery resistance and to retain the mechanical properties of a porous polymer substrate.

The porous polymer substrate may have a pore size of 0.01-5.0 μm. For example, the porous polymer substrate may have a pore size of 0.1-1.0 μm. When the pore size satisfies the above-defined range, it is possible to prevent an increase in battery resistance caused by a blocked pore structure, and to retain self-discharge characteristics in a general lithium secondary battery.

The binder polymer consists of a mixture including the first binder polymer and the second binder polymer.

In addition, the binder polymer is selected from those capable of providing binding force among inorganic particles and binding force between inorganic particles and the separator substrate layer. In addition, the first binder polymer and the second binder polymer are differentiated from each other in terms of electrolyte uptake.

The first binder polymer has an electrolyte uptake of 80-165%. According to an embodiment of the present disclosure, the first binder polymer may have an electrolyte uptake of 90-130%, 100-120%, 105-120%, or 105-115%. When the first binder polymer satisfies the above-defined range of electrolyte uptake, an electrolyte can be transported inside the binder to improve the affinity between the binder and the electrolyte, thereby providing a battery having improved characteristics.

In addition, the second binder polymer has an electrolyte uptake of 20-40%. According to an embodiment of the present disclosure, the second binder polymer may have an electrolyte uptake of 25-35%, 28-35%, or 28-33%. When the second binder polymer satisfies the above-defined range of electrolyte uptake, the binder polymer is less swelled, since an electrolyte is not absorbed thereto, and thus it is possible to prevent pore-blocking of the porous polymer substrate caused by the binder polymer and to retain the porous structure. As a result, it is possible to provide low resistance and improved battery output.

According to an embodiment of the present disclosure, two types of binder polymers each having a different specific range of electrolyte uptake, i.e. the first binder polymer having an electrolyte uptake of 80-165% and the second binder polymer having an electrolyte uptake of 20-40% are used in combination as a binder polymer. Thus, the advantages of each type of binder polymers realize a synergic effect. Therefore, it is possible to provide a separator for an electrochemical device which has improved adhesion to an electrode and adhesion to a porous substrate, and satisfies low resistance, excellent air permeability and a densely packed coating layer structure required for a separator for an electrochemical device.

The electrolyte uptake of the binder polymer (particularly, the first binder polymer and the second binder polymer) may be determined as follows.

First, a film is prepared by using the binder polymer through a phase separation process, is cut into a circular shaped film (diameter 1.8 cm; area 2.54 cm$^2$, thickness: 16 μm) (deviation, −0.5 to +0.5 μm), and then is weighed. Particularly, the film is obtained through dipping phase separation of a solution in which each binder polymer is dissolved by using a non-solvent. Next, the circular shaped binder polymer film is introduced to a mixed electrolyte solution (EC/DEC=1/1 or EC/PC=1/1, volume ratio) containing 1.0M of lithium salt ($LiPF_6$) dissolved therein and is removed therefrom after 24 hours. Then, the binder polymer film is allowed to stand in its vertically standing state for 1 minute to remove the liquid droplets on the film surface. The resultant film impregnated with the mixed electrolyte solution is weighed. The whole test is carried out in a glove box filled with argon gas under a condition containing water less than 1.0 ppm. The electrolyte uptake (%) is calculated by the formula of [(Weight of film after uptake−Weight of film before uptake)/(Weight of film before uptake)]×100.

According to an embodiment of the present disclosure, the first binder polymer may have a viscosity of 50-70 cp, particularly 55-70 cp, and more particularly 55-65 cp. When the above-defined range of viscosity is satisfied, it is possible to accelerate diffusion of the non-solvent and to increase the phase separation rate advisably.

According to an embodiment of the present disclosure, the first binder polymer may have a melting point of 130-135° C., 130-133° C., or 130-132° C. When the above-defined range of melting point is satisfied, it is possible to improve the stability, particularly heat stability, of a separator.

Meanwhile, the second binder polymer may have a viscosity of 600-800 cp, particularly 600-750 cp, and more particularly 650-750 cp. When the above-defined range of viscosity is satisfied, it is possible to slower phase separation and to form uniform pores advisably. In general, viscosity may function as steric hindrance and affect the quenching rate (solidifying and film-forming rate) of a separator.

According to an embodiment of the present disclosure, the second binder polymer may have a melting point of 135-140° C., 135-138° C., or 135-137° C. When the above-defined range of melting point is satisfied, it is possible to improve the stability, particularly heat stability, of a separator.

Herein, the viscosity of the first binder polymer means the viscosity value determined by mixing 35 parts by weight of the first binder polymer, 65 parts by weight of $Al_2O_3$ having an average particle diameter ($D_{50}$) of 500 nm, and 400 parts by weight of N-methyl-2-pyrrolidone (NMP) by using a paint shaker at room temperature for about 90 minutes or more to obtain slurry, and measuring the viscosity of the resultant slurry at a shear rate of 100/s. In addition, the viscosity of the second binder polymer means the viscosity value determined by mixing 35 parts by weight of the second binder polymer, 65 parts by weight of $Al_2O_3$ having an average particle diameter ($D_{50}$) of 500 nm, and 400 parts by weight of N-methyl-2-pyrrolidone (NMP) by using a paint shaker at room temperature for about 90 minutes or more to obtain slurry, and measuring the viscosity of the resultant slurry at a shear rate of 100/s. Herein, the paint shaker is a twin-arm paint shaker (multi-dimensional mixing motion) favorable to high-viscosity slurry mixing and dispersibility improvement. The reason why such slurry containing $Al_2O_3$ having an average particle diameter ($D_{50}$) of 500 nm as inorganic particles is used for the determination of the viscosity of the first binder polymer and that of the second binder polymer is that the first binder polymer and the second binder polymer are used for preparing the slurry for a porous coating layer of a separator subsequently, and thus the viscosity of each binder polymer in a slurry state containing inorganic particles is examined in advance to determine whether each binder polymer is suitable for slurry coating or not.

The melting point ($T_m$) of the binder polymer (particularly, the first binder polymer and the second binder polymer) is determined by using a differential scanning calorimeter (DSC) in a scanning range of −60 to 200° C.

According to an embodiment of the present disclosure, the first binder polymer may include poly(vinylidene fluoride-co-hexafluoroproyplene) (PVdF-HFP), poly(vinylidene fluoride-co-chlorotrifluoroethylene) (PVdF-CTFE), or a mixture thereof.

According to an embodiment of the present disclosure, the second binder polymer may include poly(vinylidene fluoride-co-tetrafluoroethylene) (PVdF-TFE), poly(vinylidene fluoride-co-trifluoroethylene) (PVdF-TrFE), or a mixture thereof.

According to an embodiment of the present disclosure, the first binder polymer may be poly(vinylidene fluoride-co-hexafluoroproyplene) (PVdF-HFP), and the second binder polymer may be poly(vinylidene fluoride-co-tetrafluoroethylene) (PVdF-TFE).

According to an embodiment of the present disclosure, the polyvinylidene copolymer as the first binder polymer may have repeating units derived from the comonomer other than vinylidene at a substitution ratio of 15% or less, particularly at a substitution ratio of 10-15%, based on the total repeating units (total repeating units derived from vinylidene and the other comonomer).

In addition, the polyvinylidene copolymer as the second binder polymer may have repeating units derived from the comonomer other than vinylidene at a substitution ratio of 24% or less, particularly at a substitution ratio of 20-24%, based on the total repeating units (total repeating units derived from vinylidene and the other comonomer).

Herein, 'substitution ratio' means the ratio (%) of the number of repeating units derived from a specific comonomer relative to the number of total repeating units of a polymer.

The first binder polymer may have a weight average molecular weight ($M_w$) of 10,000-1,500,000. For example, the first binder polymer may have a weight average molecular weight ($M_w$) of 10,000-600,000, or 100,000-600,000. When the first binder polymer has an excessively high weight average molecular weight, it shows low solubility and the binder solution has excessively increased viscosity, thereby making it difficult to carry out coating (application). When the first binder polymer has an excessively low weight average molecular weight, it is difficult to obtain a uniform coating layer.

The first binder polymer may be used in an amount of 5-50 parts by weight or 10-35 parts by weight, based on 100 parts by weight of the inorganic particles. When the first binder polymer is used in the above-defined range, it is possible to provide an adequate level of adhesion not only between the porous polymer substrate and the porous coating layer but also between the porous coating layer and an electrode.

The second binder polymer may have a weight average molecular weight ($M_w$) of 10,000-1,500,000. For example, the second binder polymer may have a weight average molecular weight ($M_w$) of 10,000-600,000, or 100,000-600,000. When the second binder polymer has an excessively high weight average molecular weight, it shows low solubility and the binder solution has excessively increased viscosity, thereby making it difficult to carry out coating (application). When the second binder polymer has an excessively low weight average molecular weight, it is difficult to obtain a uniform coating layer.

The weight ratio of the first binder polymer to the second binder polymer may be 50:50-85:15, 50:50-80:20, or 50:50-75:25. When the weight ratio satisfies the above-defined range, it is possible to realize viscosity suitable for application during coating, and to prevent the problems caused by an excessively high or excessively low electrolyte uptake. In addition, since both types of binder polymers having a different electrolyte uptake can realize their advantages at the same time, it is possible to form a porous coating layer structure and pores thereof having low resistance, high air permeability, high coating layer packing density and improved adhesion to an electrode.

According to an embodiment of the present disclosure, the inorganic particles are not particularly limited, as long as they are electrochemically stable. In other words, the inorganic particles are not particularly limited, as long as they cause no oxidation and/or reduction in the operating voltage range (e.g. 0-5V based on $Li/Li^+$) of an applicable electrochemical device. For example, the inorganic particles may have an average particle diameter of 0.001-3 μm, or 0.001-2 μm. When the average particle diameter of the inorganic particles satisfies the above-defined range, it is possible to improve dispersibility and to prevent an excessive increase in coating layer. Herein, the average particle diameter of the inorganic particles means the particle size ($D_{50}$) of 50% of the integrated value from a smaller particle diameter calculated based on the results of measurement of particle size distribution of the particles after the classification thereof using a conventional particle size distribution measuring system.

Non-limiting examples of the inorganic particles include $Al_2O_3$, AlOOH, $Al(OH)_3$, AlN, BN, MgO, $Mg(OH)_2$, $SiO_2$, ZnO, $TiO_2$, $BaTiO_3$, or a mixture of at least two of them.

The content of the inorganic particles in the porous coating layer may be 50-80 wt % based on 100 wt % of the porous coating layer.

According to an embodiment of the present disclosure, the porous coating layer includes inorganic particles and a binder polymer by which the inorganic particles are attached to one another to retain their binding state (i.e. the binder connects the inorganic particles with one another and fixes). In addition, the inorganic particles can retain their binding state to the porous polymer substrate by the binder. Herein, the porous coating layer has a porous structure on the surface thereof different from the porous structure at the inner part thereof.

The surface of the porous coating layer includes a plurality of nodes including the inorganic particles and the binder polymer covering at least a part of the surface of the inorganic particles, and at least one filament formed from the binder polymer of the nodes in a thread-like shape, wherein the filament may include a node-linking portion extended from the node and connecting the node with another node.

The node-linking portion on the coating layer surface may include a three-dimensional network structure similar to a nonwoven structure, formed by the binder polymer-derived filaments crossing one another. In the network structure, the inorganic particles are at least partially embedded in the binder polymer filaments, and may be distributed in such a manner that the inorganic particles may be spaced apart from one another at a specific interval by means of the filament(s). Preferably, the inorganic particles at the node-linking portion are spaced apart from one another by at least the average diameter of the inorganic particles with a view to ensuring high porosity. According to an embodiment of the present disclosure, the filaments preferably have a diameter smaller than the diameter of the nodes.

According to an embodiment of the present disclosure, at the inner part of the porous coating layer, a plurality of nodes containing the inorganic particles and the binder polymer covering at least a part of the surface of the inorganic particles can form interstitial volumes, while being in close contact with one another. Herein, the interstitial volume means a space defined by the nodes facing each other substantially in a closely packed or densely packed structure of the nodes. The interstitial volumes among the nodes may be converted into vacant spaces to form pores. The pores at the inner part of the porous coating layer totally can have a size smaller than the diameter of the inorganic particles.

As a result, the pores of the porous coating layer according to an embodiment of the present disclosure may have a unique porous structure different from the other porous structures, such as a finger-like structure formed by diffusion of the binder polymer in a non-solvent or the Benard cell structure formed by partial opening of the binder polymer at a portion including the binder polymer.

According to an embodiment of the present disclosure, the porous coating layer may have an average pore size of 10-400 nm, or 20-100 nm. The pore size may be calculated from the shape analysis through scanning electron microscopic (SEM) images, wherein the pore size is calculated by taking a closed curve formed by crossing of binder threads as a pore shape. According to an embodiment of the present disclosure, the pore size of the porous coating layer may be determined by capillary flow porometry. The capillary flow porometry is a method by which the smallest pore diameter in the thickness direction is measured. Therefore, in order to measure only the pore size of the porous coating layer through capillary flow porometry, it is required to separate the porous coating layer from the porous substrate and to measure the pore size, while the separated porous coating layer is surrounded with a non-woven fabric capable of supporting the separated porous coating layer. Herein, the pore size of the non-woven fabric should be significantly larger than the pore size of the coating layer. According to an embodiment of the present disclosure, the porous coating layer preferably has a porosity of 50-85%. When the porosity is 85% or less, it is possible to ensure dynamic property with which a pressing process for adhesion with an electrode can be tolerated, and to prevent an excessive increase in surface opening, thereby facilitating adhesion. Meanwhile, when the porosity is 50% or more, it is possible to provide preferred ion permeability, since it is higher than the porosity of the most of porous substrate.

Meanwhile, according an embodiment of the present disclosure, the porosity may be determined by using BEL-SORP (BET system) available from BEL JAPAN Co., mercury intrusion porosimetry, capillary flow porosimetry, or the like. According to an embodiment of the present disclosure, the net density of an electrode active material layer is calculated from the density (apparent density) of a finished electrode (electrode active material layer) and the compositional ratio of ingredients contained in the electrode (electrode active material layer) and density of each ingredient. Then, the porosity of an electrode active material layer may be calculated from the difference between the apparent density and the net density.

The porous coating layer may have a thickness of 0.5-5 μm on one side of the porous substrate preferably. The thickness may be 0.5 μm or more, preferably 1 μm or more. Within the above-defined range, it is possible to obtain excellent adhesion with an electrode, thereby providing improved cell strength of a battery. Meanwhile, when the thickness is 5 μm or less, it is possible to provide a battery with preferred cycle characteristics and resistance characteristics. In this context, the thickness is preferably 4 m or less, and more preferably 3 μm or less.

The separator for an electrochemical device according to an embodiment of the present disclosure may be obtained by the method comprising the steps of:

(S1) preparing slurry for a porous coating layer comprising a solvent, inorganic particles and a binder polymer, wherein the binder polymer comprises a first binder polymer and a second binder polymer;

(S2) applying the slurry for a porous coating layer to at least one surface of a porous substrate; and (S3) dipping the resultant product of steps (S2) in a solidifying solution including a non-solvent, wherein the first binder polymer has an electrolyte uptake of 100-120%, the second binder polymer has an electrolyte uptake of 25-35%, and the slurry for a porous coating layer has a viscosity value of 100-400 cp as determined at a shear rate of 100/s.

The method will be explained in more detail hereinafter.

First, a solvent, inorganic particles and a binder polymer are mixed to prepare slurry for a porous coating layer, wherein the binder polymer includes the first binder polymer and the second binder polymer.

Next, a planar porous polymer substrate having a plurality of pores is prepared. The porous polymer substrate that may be used herein is the same as described hereinabove.

The slurry for forming a porous coating layer is applied to at least one surface of the porous polymer substrate. The slurry may be applied through a conventional coating process, such as Meyer bar coating, die coating, reverse roll coating, gravure coating, or the like. When the porous coating layers are formed on both surfaces of the porous substrate, the coating solution may be applied to one surface and then to the other surface, and then solidified, washed with water and dried. However, it is preferred in terms of productivity that the coating solution is applied to both surfaces at the same time, and then solidified, washed with water and dried.

The inorganic particles and the binder polymer are the same as described above.

The solvent used for the slurry forming a porous coating layer has a solubility parameter similar to the solubility parameter of the binder polymer to be used and has a low boiling point, preferably. This is because such a solvent allows homogeneous mixing and facilitates the subsequent solvent removal.

The solvent may be used in an amount of 300-2,000 parts by weight, or 500-1,500 parts by weight, based on 100 parts by weight of the combined weight of the first binder polymer and the second binder polymer. It is possible to obtain a binder solution having a viscosity of 30 centipoise (cp) to 500 cp from the above-defined range.

Non-limiting examples of the solvent include any one selected from the group consisting of acetone, methyl ethyl ketone, tetrahydrofuran, methylene chloride, chloroform, dimethylformamide, N-methyl-2-pyrrolidone (NMP) and cyclohexane, or a mixture of at least two of them.

The slurry for a porous coating layer may have a viscosity of 100-400 cp, as determined at a shear rate of 100/s. According to an embodiment of the present disclosure, the slurry for a porous coating layer may have a viscosity of 100-300 cp, or 100-290 cp. When the viscosity of the slurry for a porous coating layer satisfies the above-defined range, it is possible to apply the slurry uniformly to the porous substrate, and thus to provide a separator having improved stability by virtue of constant values of resistance and air permeability.

Next, the resultant product of the preceding step is dipped in a solidifying solution including a non-solvent.

The non-solvent means a solvent in which the binder polymer is not dissolved. The non-solvent is not particularly limited, as long as it is miscible with the solvent used for facilitating phase separation.

Non-limiting examples of the non-solvent include water, methanol, ethanol, isopropanol, or a mixture of at least two of them.

In addition, in the step of dipping the product in a solidifying solution including the non-solvent, a solvent may be partially mixed to control the phase separation rate, when the phase separation behavior is excessively rapid. Herein, the amount of the solvent to be introduced is preferably 30 vol % or less based on the total volume of the non-solvent.

Since the non-solvent accelerates phase separation of the binder polymer in the slurry for forming a porous coating layer, it allows the binder polymer to be present in a larger amount on the surface portion of the porous coating layer. Thus, the bindability of the separator to an electrode is increased after the drying step as described below, thereby facilitating lamination.

According to an embodiment of the present disclosure, the step of dipping the product in a solidifying solution may be carried out by preparing two or more solidifying solutions, and dipping the separator coated with the slurry sequentially in each of the solidifying solutions for a predetermined time. Herein, the solidifying solutions may be prepared in such a manner that the concentration of the non-solvent may be increased sequentially as compared to the preceding step. The concentration of the non-solvent in at least the second or later solidifying solution may be higher than the concentration of the non-solvent in the first solidifying solution. For example, the concentration of the non-solvent in the first solidifying solution may be 95 wt % and that of the non-solvent in the later solidifying solution may be controlled to be higher than 95 wt %.

Since the solvent in the inorganic coating layer is exchanged with the solidifying solution and the proportion of the non-solvent in the coating layer is increased gradually, while the separator is dipped in the solidifying solution including an excessive amount of non-solvent, it is preferred to gradually increase the proportion of the non-solvent in a solidifying solution when the solidification is carried out through a plurality of steps by preparing a plurality of solidifying solutions. Meanwhile, when the non-solvent in the first solidifying solution is 100%, the solidifying solutions after the first run include the non-solvent alone.

According to an embodiment of the present disclosure, the solidifying solution may be maintained at a temperature equal to or higher than 5° C. and lower than 20° C. At a temperature lower than the above-defined range, condensation of the non-solvent occurs undesirably. At a temperature higher than the above-defined range, phase separation occurs rapidly so that the coating layer may not have a dense structure. Thus, an inorganic coating layer including desired nodes and filaments according to the present disclosure cannot be formed and the separator has an excessively dense structure of the binder at a partial region, which is not preferred in terms of resistance characteristics and realization of adhesion. Meanwhile, when a plurality of solidifying steps is carried out by preparing a plurality of solidifying solutions as mentioned above, the first solidifying solution is set to a temperature equal to or higher than 5° C. and lower than 20° C., and then the temperature of the second or later solidifying solution may be increased sequentially until the drying step is carried out. At least, the second or the later solidifying solution may be prepared to have a temperature higher than the temperature of the first solidifying solution. However, it is preferred to control the temperature of the second or later solidifying solution to a temperature equal to 40° C. or lower. At a temperature higher than the above-defined range, evaporation of the non-solvent occurs undesirably. At a temperature lower than the above-defined range, thermal impact occurs upon the introduction to a drying furnace, resulting in a risk of a change in width of the substrate.

Meanwhile, according to an embodiment of the present disclosure, the dipping tine may be controlled to 30-100 seconds, or 40-90 seconds. When the dipping time satisfies the above-defined range, it is possible to solve the problem of degradation of adhesion between the porous substrate and the porous coating layer, caused by excessive phase separation, and separation of the coating layer, and to form uniform pores in the thickness direction. Meanwhile, when a plurality of solidifying steps is carried out by preparing a plurality of solidifying solutions as mentioned above, the dipping time in the first solidifying solution may be controlled to 10-30 seconds.

Then, the resultant product obtained after dipping the separator in the solidifying solution may be dried to form a porous coating layer on at least one surface of the porous substrate. The drying step may be carried out in a drying chamber and the drying chamber is not limited to any particular condition due to the application of the non-solvent. In this manner, the porous coating layer includes a larger amount of the binder polymer on the surface portion thereof, as compared to the lower part thereof. Thus, it is possible to provide improved binding force to an electrode as mentioned above. In addition, since the porous coating layer is formed to the same height as a whole, although the portion realizing adhesion to an electrode is present, the separator has the same resistance in the surface direction.

Then, the separator obtained by the above-described method may be interposed between a positive electrode and a negative electrode and laminated therewith to provide an electrochemical device. The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer secondary batteries, are preferred.

The positive electrode and the negative electrode used in combination with the separator according to the present disclosure are not particularly limited, and may be obtained by allowing electrode active materials to be bound to at least one surface of an electrode current collector through a method generally known in the art.

Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a mixture thereof are used preferably.

Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably.

Non-limiting examples of a positive electrode current collector include foil made of aluminum, nickel or a mixture thereof. Non-limiting examples of a negative electrode current collector include foil made of copper, gold, nickel, or copper alloys or a mixture thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a mixture thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a mixture thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Manufacture of Separator

First, 28 parts by weight of polyvinylidene fluoride-co-hexafluoropropylene (PVdF-HFP) (Solef 21510 available from Solvay Co.), $T_m$ (melting point) 132° C., electrolyte uptake 110%, HFP substitution ratio 15%) as the first binder polymer, and 7 parts by weight of polyvinylidene fluoride-co-tetrafluoroethylene (PVdF-TFE) (VT-475 available from Daikin Co., $T_m$ 138° C., electrolyte uptake 30%, TFE substitution ratio 24%) as the second binder polymer were added to 400 parts by weight of N-methyl-2-pyrrolidone (NMP) and dissolved therein at 50° C. for about 12 hours or more to obtain a binder solution.

Herein, the first binder polymer had a viscosity of 60 cp, and the second binder polymer had a viscosity of 700 cp. Herein, each of the viscosity of the first binder polymer and that of the second binder polymer is the viscosity value determined from slurry containing 35 parts by weight of the corresponding binder polymer, 65 parts by weight of $Al_2O_3$ having an average particle diameter ($D_{50}$) of 500 nm (LS235 available from Japanese Light Metal Co.), and 400 parts by weight of N-methyl-2-pyrrolidone (NMP) by using a rheometer (TA instruments), at a shear rate of 100/s.

Then, 65 parts by weight of $Al_2O_3$ having an average particle diameter (Do) of 500 nm (LS235 available from Japanese Light Metal Co.), as inorganic particles, were added to the binder solution and dispersed therein by using a paint shaker to prepare slurry for forming a porous coating layer.

Herein, the slurry for forming a porous coating layer had a viscosity of 110 cp, as determined at a shear rate of 100/s by using a rheometer (TA instruments).

After that, the resultant slurry for forming a porous coating layer was coated on a polyethylene porous polymer substrate having a thickness of 12 μm (porosity 45%) through a rod coating process, and then was dipped in water as a non-solvent to carry out phase separation. The dipping time was 40 seconds. Then, the resultant product was dried in an oven at a temperature of 75° C. to obtain a separator for an electrochemical device.

Manufacture of Positive Electrode and Negative Electrode

First, 97 wt % of $LiCoO_2$, 1.5 wt % of carbon black powder as a conductive material and 1.5 wt % of polyvinylidene fluoride (PVdF, Kureha) were mixed and introduced to N-methyl-2-pyrrolidone as a solvent. Then, the resultant mixture was agitated by using a mechanical agitator for 30 minutes to prepare positive electrode active material slurry. The slurry was applied to an aluminum current collector having a thickness of 20 μm by using a doctor blade to a thickness of about 60 μm, dried in a hot air dryer at 100° C. for 0.5 hours, and then further dried at 120° C. for 4 hours, followed by roll pressing, to obtain a positive electrode.

Meanwhile, 96.5 wt % of artificial graphite particles (LC1, Shanshan) having an average particle diameter of 16 μm, 2.3 wt % of styrene-butadiene rubber (SBR) binder (ZEON) and 1.2 wt % of carboxymethyl cellulose (CMC, Daicel) were mixed and introduced to distilled water. The resultant mixture was agitated by using a mechanical agitator for 60 minutes to obtain negative electrode active material slurry. The slurry was applied to a copper current collector having a thickness of 8 μm by using a doctor blade to a thickness of about 60 μm, dried in a hot air dryer at 100° C. for 0.5 hours, and then further dried at 120° C. for 4 hours, followed by roll pressing, to obtain a negative electrode.

Manufacture of Lithium Secondary Battery

The separator was interposed between the positive electrode and the negative electrode obtained as described above, and lamination was carried out at 80° C. under a load of 100 kgf to obtain a unit cell. The unit cell was inserted into a pouch, and an organic electrolyte containing 1M $LiPF_6$ dissolved in a mixed solvent of ethylene carbonate (EC)/ethyl methyl carbonate (EMC)/diethyl carbonate (DEC) at a ratio of 3/5/2 (volume ratio) was injected thereto. Then, the pouch was vacuum-sealed and activation was carried out to finish a lithium secondary battery.

Example 2

A separator and a lithium secondary battery were obtained in the same manner as Example 1, except that PVdF-HFP (Solef 21510) was used in an amount of 17.5 parts by weight, PVdF-TFE (VT-475) was used in an amount of 17.5 parts by weight, the slurry for a porous coating layer had a viscosity of 209 cp at a shear rate of 100/s, the slurry for forming a porous coating layer was coated on a polyethylene porous polymer substrate (porosity 45%) having a thickness of 12 μm through a rod coating process, and the dipping time was 40 seconds when the phase separation is carried out by dipping the separator in water as a non-solvent.

Example 3

A separator and a lithium secondary battery were obtained in the same manner as Example 1, except that the dipping time in water as a non-solvent was 90 seconds.

Example 4

A separator and a lithium secondary battery were obtained in the same manner as Example 1, except that Kynar 2500 available from Arkema Co. was used as PVdF-HFP.

Example 5

A separator and a lithium secondary battery were obtained in the same manner as Example 1, except that Kynar 2751 available from Arkema Co. was used as PVdF-HFP.

Example 6

A separator and a lithium secondary battery were obtained in the same manner as Example 2, except that Kynar 2500 available from Arkema Co. was used as PVdF-HFP.

Example 7

A separator and a lithium secondary battery were obtained in the same manner as Example 2, except that Kynar 2751 available from Arkema Co. was used as PVdF-HFP.

Comparative Example 1

A separator and a lithium secondary battery were obtained in the same manner as Example 1, except that 35 parts by weight of PVdF-HFP (Solef 21510) was used alone as a binder polymer, 65 parts by weight of $Al_2O_3$ was used, and the slurry for a porous coating layer had a viscosity of 60 cp at a shear rate of 100/s.

Comparative Example 2

A separator and a lithium secondary battery were obtained in the same manner as Example 1, except that 70 parts by weight of PVdF-HFP (Solef 21510) was used alone as a binder polymer, 30 parts by weight of $Al_2O_3$ was used, and the slurry for a porous coating layer had a viscosity of 75 cp at a shear rate of 100/s.

Comparative Example 3

A separator and a lithium secondary battery were obtained in the same manner as Comparative Example 1, except that the dipping time in water as a non-solvent was 90 seconds.

Comparative Example 4

A separator and a lithium secondary battery were obtained in the same manner as Example 1, except that 8200 available from Kureha Corp. was used as PVdF-HFP.

Comparative Example 5

A separator and a lithium secondary battery were obtained in the same manner as Example 1, except that LBG available from Arkema Co. was used as PVdF-HFP.

Comparative Example 6

A separator and a lithium secondary battery were obtained in the same manner as Example 1, except that the second binder polymer was introduced in the same amount as the first binder polymer, instead of the first binder polymer.

Comparative Example 7

A separator and a lithium secondary battery were obtained in the same manner as Example 1, except that PVdF-CTFE (Solef 32008 available from Solvay Co.) was used in the same amount as PVdF-TFE as the second binder polymer, instead of PVdF-TFE.

Comparative Example 8

A separator and a lithium secondary battery were obtained in the same manner as Example 1, except that PVdF-CTFE (Solef 32008 available from Solvay Co.) was used in the same amount as PVdF-HFP as the first binder polymer, instead of PVdF-HFP.

Comparative Example 9

A separator and a lithium secondary battery were obtained in the same manner as Example 1, except that PVdF homopolymer (1100 available from Kureha Corp.) was used in the same amount as PVdF-TFE as the second binder polymer, instead of PVdF-TFE.

Test Examples

Observation of Cross Section of Separator

The cross section of each of the separators according to Example 1 and Comparative Example 1 was observed by using a scanning electron microscope (FE-SEM) (Hitachi S-4800 Scanning Electron Microscope). The SEM image of the cross section of the separator according to Example 1 is shown in FIG. 1 and the SEM image of the cross section of the separator according to Comparative Example 1 is shown in FIG. 2.

Figure 2:
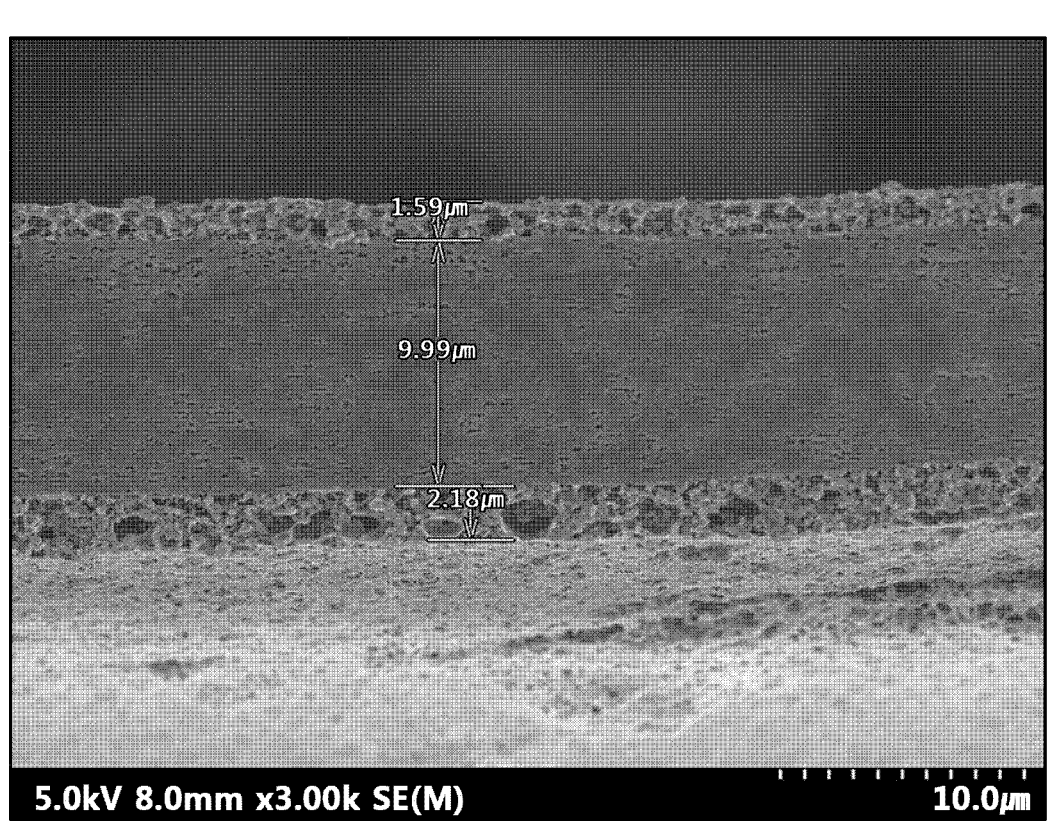
FIG. 2 is an electron microscopic image illustrating the cross section of the separator according to Comparative Example 1.

Referring to FIG. 1, it can be seen that the inner part of the porous coating layer of the separator according to Example 1 has a portion in which a plurality of nodes including the inorganic particles and the binder polymer covering at least a part of the surface of the inorganic particles are concentrated, wherein filaments formed from the binder polymer of the nodes have a thread-like shape and include a node-linking portion extended from the node and connecting the node with another node. The nodes form interstitial volumes while being in close contact with one another, and the pores formed by the interstitial volumes converted into vacant spaces totally have a size smaller than the diameter of the inorganic particles. Further shown in FIG. 1, the filaments cross one another to form a three-dimensional network structure similar to a nonwoven structure, wherein the inorganic particles are at least partially embedded in the filaments and spaced apart from one another by means of the filaments. On the contrary, referring to FIG. 2, it can be seen that the porous coating layer of the separator according to Comparative Example 1 has a porous structure in which a plurality of finger-like structured pores having a significantly large size are present due to the use of PVDF-HFP having a high phase separation rate alone as a binder polymer and rapid diffusion of the binder polymer into the non-solvent.

Method for Determining Electrolyte Uptake of Binder Polymer (First Binder Polymer and Second Binder Polymer)

A film was prepared by using the binder polymer through a phase separation process, was cut into a circular shaped film (diameter: 1.8 cm; area; 2.54 cm$^2$; thickness: 16 μm (deviation, −0.5 to +0.5 μm)), and then was weighed. Particularly, the film was obtained through dipping phase separation of a solution in which each binder polymer was dissolved by using a non-solvent. Next, the circular shaped binder polymer film was introduced to a mixed electrolyte solution (EC/DEC=1/1 or EC/PC=1/1 volume ratio) containing 1.0M of lithium salt (LiPF$_6$) dissolved therein and was removed therefrom after 24 hours. Then, the binder polymer film was allowed to stand in its vertically standing state for 1 minute to remove the liquid droplets on the film surface. The resultant film impregnated with the mixed electrolyte solution was weighed. The whole test was carried out in a glove box filled with argon gas under a condition containing water less than 1.0 ppm. The electrolyte uptake (%) was calculated by the formula of [(Weight of film after uptake−Weight of film before uptake)/(Weight of film before uptake)]×100.

Method for Determining Resistance

The resistance of each of the separators according to Examples 1-7 and Comparative Examples 1-9 was determined as follows. An electrolyte was prepared by dissolving 1M LiPF$_6$ in a mixed solvent containing ethylene carbonate, propylene carbonate and propyl propionate at a ratio (volume ratio) of 25:10:65. After each separator was allowed to uptake the electrolyte, a coin cell was manufactured and the resistance of each coin cell was determined by using an electrochemical impedance spectroscopy (EIS) system. The results are shown in the following Table 1.

Method for Determining Air Permeability

The air permeability of each of the separators according to Examples 1-7 and Comparative Examples 1-9 was determined by using a Gurley type air permeability tester according to JIS P-8117.

Herein, the time required for 100 mL of air to pass through a diameter of 28.6 mm and an area of 645 mm$^2$ was measured. The results are shown in the following Table 1.

Adhesion to Substrate (Peel Force)

Each of the separators according to Examples 1-7 and Comparative Examples 1-9 was cut into a size of 100 mm (length)×25 mm (width) to prepare two test specimens. The two test specimens of each of the separators according to Examples 1-7 and Comparative Examples 1-9 was stacked and subjected to hot pressing at 100° C. for 10 seconds to obtain a laminate. The laminate was fixed to an adhesion strength tester (LLOYD Instrument, LF plus) and the upper separator specimen was peeled off at 25° C. and a rate of 100 mm/min with an angle of 180°, and the adhesion strength was measured. The results are shown in the following Table 1.

Method for Determining Adhesion between Separator and Electrode (Adhesion to Electrode, Lami Strength)

The negative electrode according to Example 1 was cut into a size of 25 mm×100 mm. Each of the separators according to Examples 1-7 and Comparative Examples 1-9 was cut into a size of 25 mm×100 mm. Each separator was stacked with the negative electrode, inserted between PET films (100 μm) and adhered with each other by using a flat press. Herein, the flat press carried out heating at 70° C. under a pressure of 600 kgf (3.9 MPa) for 1 second. The end of the adhered separator and negative electrode was mounted to an UTM system (LLOYD Instrument LF Plus), and then the force required for separating the negative electrode from the porous coating layer facing the negative electrode was measured by applying force thereto at 180° with a rate of 300 mm/min.

TABLE 1

| | Binder polymer composition (weight ratio) | First binder polymer | Second binder polymer | Slurry viscosity (cp) | Dipping time (seconds) | Resistance (ohm) | Air permeability (s/100 cc) | Adhesion to substrate (peel force) (gf/25 mm) | Adhesion to electrode (gf/25 mm) |
|---|---|---|---|---|---|---|---|---|---|
| Ex. 1 | PVDF-HFP:PVdF-TFE = 4:1 | PVDF-HFP Electrolyte uptake 110% Viscosity 60 cP | PVdF-TFE Electrolyte uptake 30% Viscosity 700 cP | 110 | 40 | 0.98 | 130 | 156 | 177 |
| Ex. 2 | PVDF-HFP:PVdF-TFE = 1:1 | PVDF-HFP Electrolyte uptake 110% Viscosity 60 cP | PVdF-TFE Electrolyte uptake 30% Viscosity 700 cP | 290 | 40 | 0.81 | 135 | 285 | 191 |
| Ex. 3 | PVDF-HFP:PVdF-TFE = 4:1 | PVDF-HFP Electrolyte uptake 110% Viscosity 60 cP | PVdF-TFE Electrolyte uptake 30% Viscosity 700 cP | 110 | 90 | 0.96 | 132 | 150 | 168 |
| Ex. 4 | PVDF-HFP:PVdF-TFE = 4:1 | PVDF-HFP Electrolyte uptake 120% Viscosity 45 cP | PVdF-TFE Electrolyte uptake 30% Viscosity 700 cP | 100 | 40 | 1.01 | 133 | 177 | 182 |
| Ex. 5 | PVDF-HFP:PVdF-TFE = 4:1 | PVDF-HFP Electrolyte uptake 100% Viscosity 70 cP | PVdF-TFE Electrolyte uptake 30% Viscosity 700 cP | 120 | 40 | 0.94 | 120 | 137 | 191 |
| Ex. 6 | PVDF-HFP:PVdF-TFE = 1:1 | PVDF-HFP Electrolyte uptake 120% Viscosity 45 cP | PVdF-TFE Electrolyte uptake 30% Viscosity 700 cP | 260 | 40 | 0.85 | 135 | 291 | 187 |
| Ex. 7 | PVDF-HFP:PVdF-TFE = 1:1 | PVDF-HFP Electrolyte uptake 100% Viscosity 70 cP | PVdF-TFE Electrolyte uptake 30% Viscosity 700 cP | 300 | 40 | 0.77 | 132 | 276 | 203 |
| Comp. Ex. 1 | PVDF-HFP:PVdF-TFE = 1:0 | PVDF-HFP Electrolyte uptake 110% Viscosity 60 cP | | 60 | 40 | 1.15 | 140 | 125 | 130 |
| Comp. Ex. 2 | PVDF-HFP:PVdF-TFE = 1:0 | PVDF-HFP Electrolyte uptake 110% Viscosity 60 cP | | 75 | 40 | 1.27 | 145 | 115 | 120 |
| Comp. Ex. 3 | PVDF-HFP:PVdF-TFE = 1:0 | PVDF-HFP Electrolyte uptake 110% Viscosity 60 cP | | 60 | 90 | 1.22 | 155 | 20 | 50 |
| Comp. Ex. 4 | PVDF-HFP:PVdF-TFE = 4:1 | PVDF-HFP Electrolyte uptake 60% Viscosity 220 cP | PVdF-TFE Electrolyte uptake 30% Viscosity 700 cP | 350 | 40 | 0.90 | 125 | 133 | 72 |
| Comp. Ex. 5 | PVDF-HFP:PVdF-TFE = 4:1 | PVDF-HFP Electrolyte uptake 70% Viscosity 180 cP | PVdF-TFE Electrolyte uptake 30% Viscosity 700 cP | 330 | 40 | 0.91 | 129 | 164 | 91 |
| Comp. Ex. 6 | PVDF-HFP:PVdF-TFE = 0:1 | | PVdF-TFE Electrolyte uptake 30% Viscosity 700 cP | 650 | 40 | 0.88 | 131 | 311 | 21 |
| Comp. Ex. 7 | PVDF-HFP:PVdF-CTFE = 4:1 | PVDF-HFP Electrolyte uptake 110% Viscosity 60 cP | PVdF-CTFE Electrolyte uptake 210% Viscosity 90 P | 70 | 40 | 1.22 | 142 | 155 | 180 |
| Comp. Ex. 8 | PVDF-CTFE:PVdF-TFE = 4:1 | PVdF-CTFE Electrolyte uptake 210% Viscosity 90 cP | PVdF-TFE Electrolyte uptake 30% Viscosity 700 cP | 130 | 40 | 1.18 | 138 | 217 | 33 |

TABLE 1-continued

| Binder polymer composition (weight ratio) | First binder polymer | Second binder polymer | Slurry viscosity (cp) | Dipping time (seconds) | Resistance (ohm) | Air permeability (s/100 cc) | Adhesion to substrate (peel force) (gf/25 mm) | Adhesion to electrode (gf/25 mm) |
|---|---|---|---|---|---|---|---|---|
| Comp. Ex. 9 | PVDF-HFP:PVdF = 4:1 | PVDF-HFP Electrolyte uptake 110% Viscosity 60 cP | PVdF Electrolyte uptake 15% Viscosity 300 cP | 100 | 40 | 0.95 | 132 | 152 | 97 |

Referring to Table 1, it can be seen that each of the separators according to Example 1-7, which uses the first binder polymer having an electrolyte uptake of 80-165% and the second binder polymer having an electrolyte uptake of 20-40%, shows low resistance, high air permeability, and improved adhesion to an electrode and adhesion to a substrate.

On the contrary, when using the first binder polymer alone (Comparative Examples 1-3), resistance is increased and peel force and adhesion to an electrode are significantly reduced. In addition, when using the second binder polymer alone (Comparative Example 6), adhesion to an electrode is significantly reduced. Further, even though two types of binder polymers having a different electrolyte uptake are used as the first binder polymer and the second binder polymer, adhesion to an electrode is significantly reduced or resistance is increased, when each binder polymers has an electrolyte uptake not within the above-defined range of electrolyte uptake, i.e. an electrolyte uptake of 80-165% in the case of the first binder polymer, and an electrolyte uptake of 20-40% in the case of the second binder polymer (Comparative Examples 4, 5 and 7-9).

What is claimed is:

1. A separator for an electrochemical device, comprising:
a porous substrate having a plurality of pores; and
a porous coating layer positioned on at least one surface of the porous substrate, the porous coating layer comprising a plurality of inorganic particles and a binder polymer positioned on a whole or a part of a surface of the inorganic particles to connect the inorganic particles with one another and fix the inorganic particles,
wherein the binder polymer comprises
a first binder polymer comprising poly (vinylidene fluoride-co-hexafluoropropylene) (PVdF-HFP), poly (vinylidene fluoride co chlorotrifluoroethylene) (PVdF-CTFE), or a mixture thereof and
a second binder polymer comprising poly (vinylidene fluoride-co-tetrafluoroethylene) (PVdF-TFE),
wherein the PVdF-TFE has vinylidene-derived repeating units and tetrafluoroethylene-derived repeating units, and includes tetrafluoroethylene-derived repeating units at a substitution ratio of 20-24%, based on the total repeating units (vinylidene-derived repeating units and tetrafluoroethylene-derived repeating units),
wherein a weight ratio of the first binder polymer to the second binder polymer is 50:50-80:20,
wherein the first binder polymer has an electrolyte uptake of from 80% to 120%,
wherein the second binder polymer has an electrolyte uptake of from 25% to 34%,
wherein the electrolyte uptake in % is calculated by a formula of

[(Weight of film after uptake−Weight of film before uptake)/(Weight of film before uptake)]×100, and wherein the electrolyte uptake is measured by:
dissolving the first binder polymer and the second binder polymer into a non-solvent and performing dipping phase separation to obtain the film,
cutting the film into a circular shaped film with a diameter of 1.8 cm, an area of 2.54 cm² and a thickness of 16 μm with a deviation of −0.5 to +0.5 μm, and then weighing the film before uptake,
introducing the circular shaped film to a mixed electrolyte solution where EC/DEC=1/1 or EC/PC=1/1 in volume ratio containing 1.0M of LiPF₆ dissolved therein and removing therefrom after 24 hours,
allowing the circular shaped film to stand in its vertically standing state for 1 minute to remove liquid droplets on a film surface, and
weighing a resultant film impregnated with the mixed electrolyte solution after uptake,
wherein the electrolyte uptake is measured in a glove box filled with argon gas under a condition containing water less than 1.0 ppm.

2. The separator for the electrochemical device according to claim 1, wherein the first binder polymer has a melting point of 130-135° C., and the second binder polymer has a melting point of 135-140° C.

3. The separator for the electrochemical device according to claim 1, wherein the first binder polymer has a viscosity of 50-70 cp,
the second binder polymer has a viscosity of 600-800 cp, and
the viscosity is determined at a shear rate of 100/s from slurry containing 35 parts by weight of the first binder polymer or the second binder polymer, 65 parts by weight of Al₂O₃ having an average particle diameter (D₅₀) of 500 nm, and 400 parts by weight of N-methyl-2-pyrrolidone (NMP).

4. The separator for the electrochemical device according to claim 1, wherein the first binder polymer has an electrolyte uptake of 90-120%, and
the second binder polymer has an electrolyte uptake of 25-34%.

5. The separator for the electrochemical device according to claim 1, wherein at least one surface of the porous coating layer comprises a plurality of nodes including the inorganic particles and the binder polymer covering at least a part of the surface of the inorganic particles, and at least one filament formed from the binder polymer of the nodes in a thread-like shape, and the filament comprises a node-linking portion extended from the node and connecting the node with another node.

6. The separator for the electrochemical device according to claim 5, wherein the plurality of nodes containing the inorganic particles and the binder polymer covering at least a part of the surface of the inorganic particles form interstitial volumes, while being in close contact with one another, wherein at an inner part of the porous coating layer, the interstitial volumes are converted into vacant spaces to form pores having a size smaller than a diameter of the inorganic particles.

7. The separator of claim 1, wherein the porous substrate has a porosity of 30% to 75%.

8. An electrochemical device comprising a positive electrode, a negative electrode and a separator interposed between the positive electrode and the negative electrode, wherein the separator is the separator of claim 1.

9. The electrochemical device according to claim 8, wherein the electrochemical device is a secondary battery.

\* \* \* \* \*